United States Patent [19]

Holt

[11] 4,090,223

[45] May 16, 1978

[54] VIDEO SYSTEM FOR STORING AND RETRIEVING DOCUMENTARY INFORMATION

[75] Inventor: Arthur W. Holt, Annapolis, Md.

[73] Assignee: Videofax Communications Corporation, Washington, D.C.

[21] Appl. No.: 742,171

[22] Filed: Nov. 16, 1976

[51] Int. Cl.² .............................................. H04N 1/36
[52] U.S. Cl. ........................................ 360/35; 360/72
[58] Field of Search ................. 360/35, 72, 9, 10, 101;
340/173 DR

[56] References Cited

U.S. PATENT DOCUMENTS

| | | | |
|---|---|---|---|
| 3,095,473 | 6/1963 | Ruizen | 360/10 |
| 3,514,537 | 5/1970 | Uemura | 360/72 |
| 3,573,356 | 4/1971 | Toce | 360/9 |
| 3,594,729 | 7/1971 | Uemura | 360/72 |
| 3,715,481 | 2/1973 | Harr | 360/35 |
| 3,761,611 | 9/1973 | Nakamura | 360/35 |
| 3,803,352 | 4/1974 | Goldberger | 360/9 |
| 3,934,268 | 1/1976 | Uemura | 360/72 |

OTHER PUBLICATIONS

IBM Technical Disclosure Bulletin, vol. 18, No. 8, Jan. 1976, pp. 2705, 2706.

*Primary Examiner*—John H. Wolff
*Attorney, Agent, or Firm*—Michael Ebert

[57] ABSTRACT

A video system for storing and retrieving documentary information. In the storage mode, each document to be filed is scanned by a high-resolution video camera to produce a video signal representing a single image frame having a predetermined number of scan lines. The frame signal is electronically divided into a series of fields each having a like number of scan lines, the fields being applied successively to the recording heads of a multi-headed magnetic tape recorder in which the heads are vertically offset with respect to each other. The heads are mounted on a rotating arm and are caused thereby to sweep across a stationary magnetic tape to record the fields thereon in a set of parallel transverse tracks. The tape is indexed to store each document in a distinct set of tracks. In the playback mode, a selected set of tracks on the tape is presented to the heads which are then rotated to continuously yield a series of fields which are applied in the proper sequence to a high resolution video display device to recreate the selected document.

10 Claims, 11 Drawing Figures

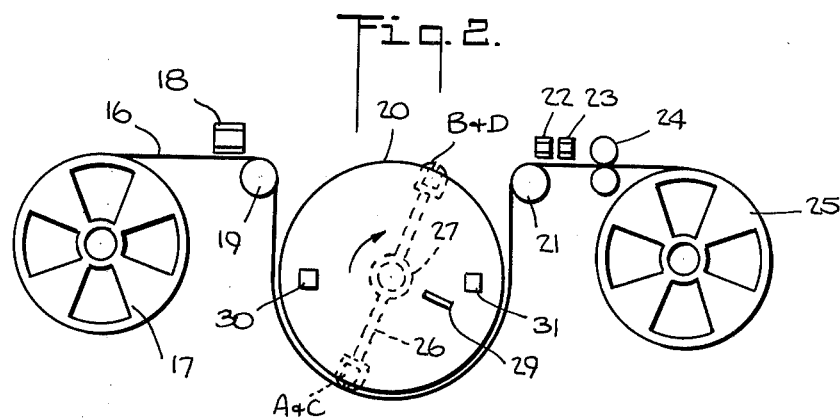
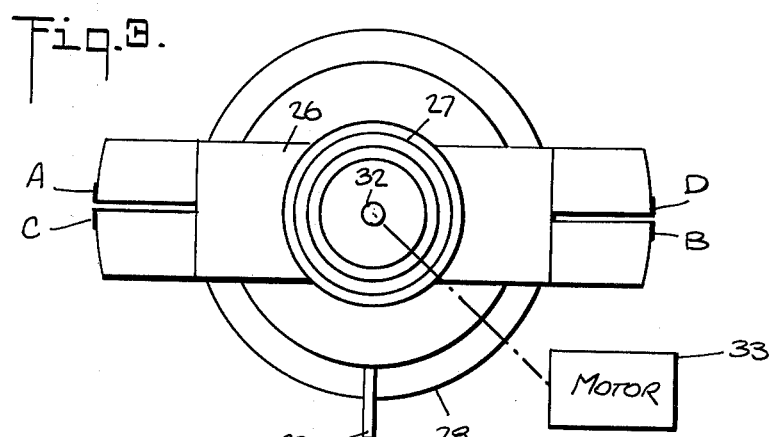
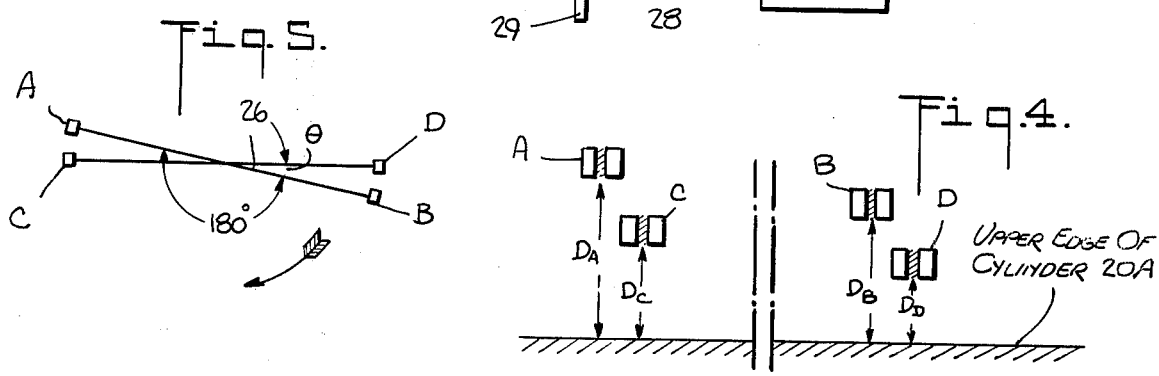
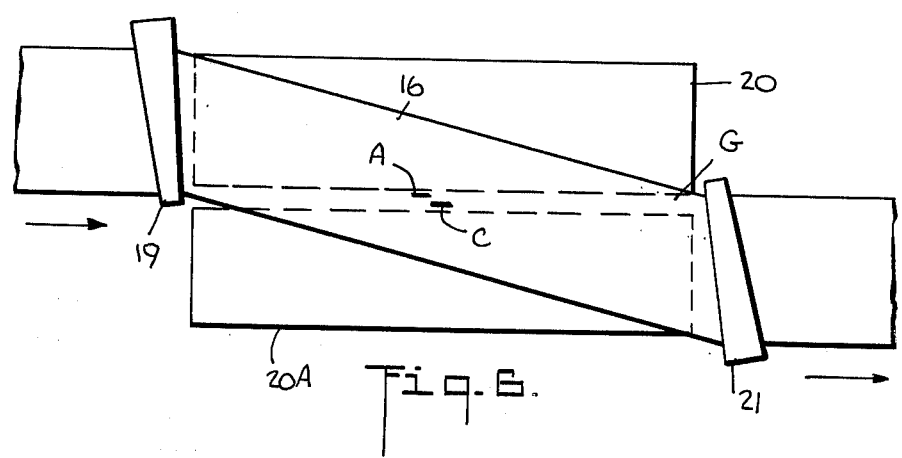

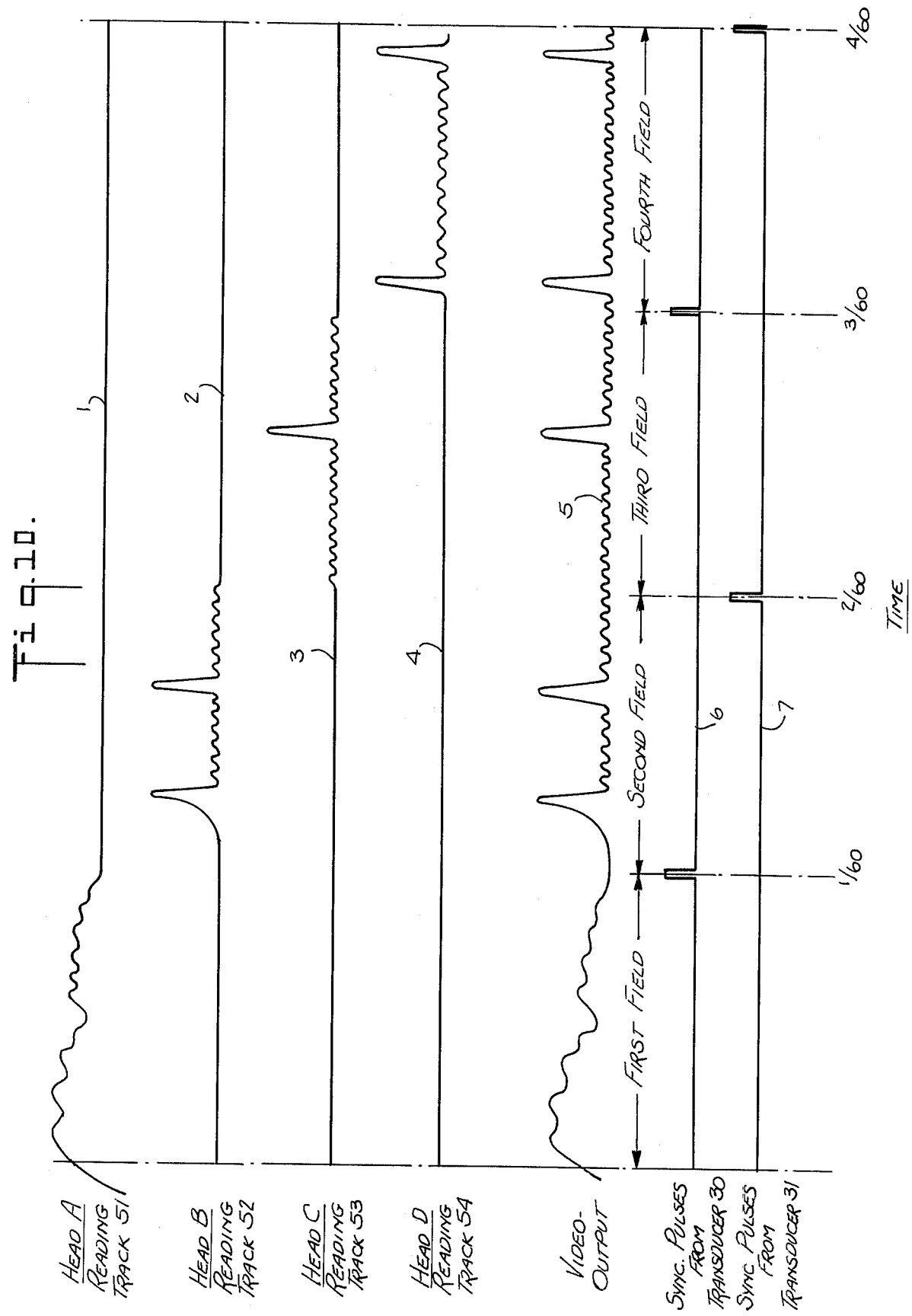

VIDEO SYSTEM FOR STORING AND RETRIEVING DOCUMENTARY INFORMATION

BACKGROUND OF THE INVENTION

This invention relates generally to video systems for the storage and retrieval of documentary information, and more particularly to a video system including a multi-head magnetic tape recorder for recording and playing back video images while the magnetic tape is stationary.

Video filing systems are known (see U.S. Pat. Nos. 3,594,729 and 3,514,537) which are adapted to record and store documentary information whereby a large body of information may be concentrated in a compact bank from which it can readily be retrieved on demand. In one such video filing system, paper documents are converted by a high-resolution video camera into corresponding high-resolution video image signals. These signals, together with identifying addresses, are automatically filed and stored on magnetic tape reels.

In this video filing system, any individual document page can automatically be retrieved, looked at in its original size, purged, reorganized with other images or shifted to various locations. An image of a recalled document is presented for viewing on a high-resolution television screen from which it can be reproduced as a hard copy. Since the document images are electronic in nature, filing and retrieval can be carried out remotely from a central file.

The crucial cost factor in a video filing system of this type lies in its means to store the documents as compact video images on magnetic tape which, when played back, are as readable as the original documents. The fact that commercial television systems afford clear images does not means that such systems are suitable for document storage and retrieval. There is a vast difference between being able to read on a T-V screen an 8½ × 11 inch document having more than a thousand characters printed on the page, and being able to see on the screen a picture of a house, for in the latter instance, gross detail is sufficient to give one a clear impression of a house, whereas in the former, small printed characters cannot be deciphered.

Thus a video filing system must employ high-resolution video means for recording and displaying documents. An electronic image of a document is created by scanning an optical image of the document focused on the photo-sensitive surface of the video camera tube. Scanning is effected by sweeping an electron beam across the sensitive surface, each sweep being a scan line. By the time the beam has sequentially scanned across the entire picture area from top to bottom, it has created an electronic image of the original document to complete an image frame.

The number of scan lines in an image frame determines one dimension of its resolution or readability. Resolution is a measure of how readable a document is when retrieved from the video picture. Commercial television in the United States has an established standard of 525 scan lines per frame. The resultant resolution is altogether inadequate for normal printed matter. Hence in one known video filing system, use is made of a high-resolution camera and a display tube having 1,280 scan lines in each frame. The other dimension involved in resolution is normally determined by the upper frequency limit of the system.

With a high-resolution system of the known type, the magnetic tape storage components and all other functioning elements of the system are designed to operate with the high-resolution scan line number. As a consequence of this requirement, use cannot be made of commercially-available video recording components designed to operate with the standard 525 scan line number per frame.

Another drawback of the known system which discourages its adoption is that when video signals from the storage bank are to be transmitted over common video carrier lines to a remote user terminal, one cannot use standard T-V transmission facilities for this purpose, for such facilities are incapable of conveying the frequencies of a high-resolution video signal. For example, even if a common video carrier line is capable of carrying a 7 megacycle high-resolution video signal as well as the standard 4 megacycle video signal, the associated synchronization system which is designed for the existing standard will not function with the high resolution signal. Hence, special carrier lines are called for, and this fact adds considerably to installation and operating costs.

The practical consequences of these restrictions are serious and have discouraged the adoption of video filing systems; for while standard components are mass-produced, high-resolution recording equipment is not an off-the-shelf item. High resolution devices must be custom-manufactured and inevitably are far more expensive than standard equipment.

With a view to overcoming the practical limitations of a video filing system of the above-described type, the Goldberger U.S. Pat. No. 3,803,352 discloses a hybrid high-resolution/low-resolution video information storage and retrieval system. The entire disclosure of this patent is incorporated herein by reference. In the Goldberger system, the video camera tube for converting the documents into video signals and the video display tube on whose screen the stored documents are reproduced both function as high-resolution devices with a scan line number per frame that is a predetermined multiple of the standard T-V low resolution number and with a frame repetition rate that is a complementary sub-multiple of the standard rate.

For example, in the Goldberger system, a preferred high-resolution frame line number is 1,575, which is exactly three times the standard 525-line number, in which event the sub-multiple is 10 frames per second, which is exactly one-third the standard frame repetition rate of 30 frames per second. Thus if the standard scan line number is multiplied by three, the frame rate is divided by the same factor.

As pointed out in the Goldberger patent, the multiple/sub-multiple relationship between the standard T-V values and the selected high-resolution T-V values need not be 3:⅓ but may be higher, such as 4:¼ or 5:1/5. For purposes of illustrating the present invention, a 2:½ relationship has been chosen, but it will be apparent that other relationships are feasible.

The video signals generated by the high-resolution camera in the Goldberger system are stored in a standard low-resolution magnetic storage device. In order to reconcile this low-resolution apparatus with the high-resolution camera and with a high-resolution display tube, a buffer is provided that functions to divide the video signals representing a single image frame into distinct signal fields, each having a scan line number equal to the standard line number per frame within a time period equal to the full frame period of the standard frame repetition rate.

For this purpose, Goldberger makes use of a buffer to temporarily record and store a single frame, the buffer being in the form of a disc-type recorder whose operation is controlled by a switching circuit. The buffer is adapted to accept the 1,575 line per frame video signal (10 frames per second) from the camera and to divide this signal equally among three parallel continuous tracks on the disc recorder, whereby the first 525 lines of the full frame, which appear during a one-thirtieth of a second interval, go to the first continuous track, the second 525 lines, which appear in the next one-thirtieth of a second, go to the second continuous track, and the final 525 lines of the same frame, which appear in the last one-thirtieth of a second, go to the third continuous track. Thus the high-resolution video signal is divided into three equal signal fields, each of which has the standard scan line number and frame repetition ratio. However, each field represents only one-third of the total high-resolution frame.

In playback, the buffer disc is continuously rotated to repeat the image frames to provide a stationary image on the T-V screen for as long as the user requires the image. With a low-resolution disc recorder in which the course of a full disc revolution takes place in one-thirtieth of a second, a recording of a single high-resolution frame from the video camera takes place sequentially on three tracks in the course of three revolutions. Thus, a full high-resolution frame composed of three signal fields is recorded in one-tenth of a second.

If one were to play back any one continuous track on the disc on a standard T-V display tube, one would see only a third of the original document, which would appear at the standard 525 line-30 frame per second rate. In order, therefore, to reconstruct the document, all three tracks must be played back in sequence.

The buffer disc recorder is provided with a unitary assembly of three recording heads, each associated with one of the three tracks in a disc having a large number of concentric tracks. The switching circuit, which is controlled by the T-V camera, acts to render the first head operative for the first signal section of 525 lines, the second head being rendered operative for the next 525 lines and the third head for the final 525 lines.

Thus the three continuous tracks on the buffer disc are recorded in sequence. When another document is to be recorded, the tri-head assembly is automatically mechanically indexed to the next set of three tracks on the disc. Since the buffer disc serves only for temporary storage, means are provided to erase the recordings after the buffer has performed its required function. Since a document frame appears in a set of three continuous tracks on the buffer disc, it may be transferred to the magnetic tape recorder which is in the standard format.

Hence in the Goldberger system, in order to store the high-resolution video signals produced by the high-resolution camera, the signals must be recorded temporarily on the separate track of a rotating buffer disc and then transferred from the buffer disc to magnetic tape for permanent storage therein, whereas in the playback mode, the fields recorded on the magnetic tape must be returned to the disc and from there fed to the high-resolution display tube.

SUMMARY OF INVENTION

In view of the foregoing, it is the main object of this invention to provide in a hybrid high-resolution/low-resolution information storage and retrieval video system a multi-headed video tape recording and playback arrangement functioning to divide the video signals from the high-resolution camera into signal fields and to permanently record these fields on a stationary magnetic tape.

In contradistinction to the Goldberger arrangement, in the present system there is no need for temporary recording, for the field signals sequentially applied to the respective heads of the recorder are directly recorded on the stationary magnetic tape.

Also an object of the invention is to provide a relatively simple yet efficient video system for storing and retrieving documentary information which operates efficiently and reliably and which may be manufactured at low cost.

Among the advantages gained by the present invention are the following:

A. As distinguished from a moving tape system, the present system, which uses a stationary tape, itself provides a "refresh memory" to keep intelligence flowing into a CRT monitor during playback.

B. Synchronization of the stationary tape video recorder with any other video source or sync device is much simpler than for a moving tape recorder.

C. The time required for establishing synchronization between a moving tape and a rotating head is saved—an important factor in many systems.

D. No buffer memory external to the stationary tape system is necessary during recording.

Briefly stated, these objects and advantages are attained in a system which in the storage mode scans each document to be filed with a high-resolution video camera to produce a video signal representing a single image frame having a predetermined number of scan lines.

The frame signal is electronically divided into a series of fields each having a like number of scan lines, the fields being successively applied to the recording heads of a multi-headed magnetic tape recorder in which the heads are vertically offset with respect to each other. The heads are mounted on a rotating arm and are caused thereby to sweep across a stationary magnetic tape to transversely record the fields thereon in a set of parallel tracks. The tape is indexed to store each document in a distinct set of tracks. Also recorded on the tape along longitudinal tracks are position control and address information for accurate positioning of the tape and to facilitate retrieval of the recorded information.

In the playback mode, the tape is advanced to present to the heads a desired track set, and the heads are then rotated to continuously yield a series of fields which are applied in the proper sequence to a high-resolution video display device to repeatedly reconstitute the image frame and thereby recreate the document selected from the magnetic tape file.

OUTLINE OF DRAWING

For a better understanding of the invention as well as other objects and further features thereof, reference is made to the following detailed description to be read in conjunction with the accompanying drawings, wherein:

FIG. 1 is a simplified block diagram of a video system in accordance with the invention for storing and retrieving documentary information;

FIG. 2 schematically illustrates the magnetic tape recorder included in the system;

FIG. 3 is a plan view of the rotating head assembly;

FIG. 4 illustrates the manner in which the magnetic recording heads are offset with respect to each other;

FIG. 5 shows the angular relationship of the recording heads;

Figure 9:
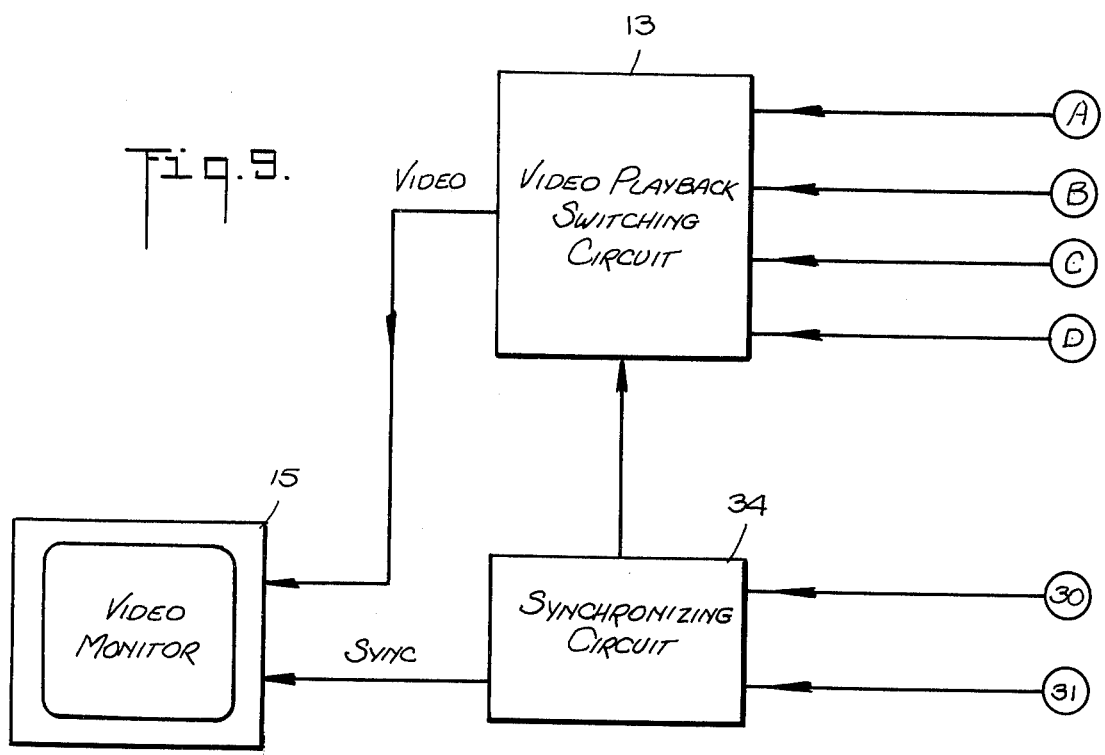
Figure 7:
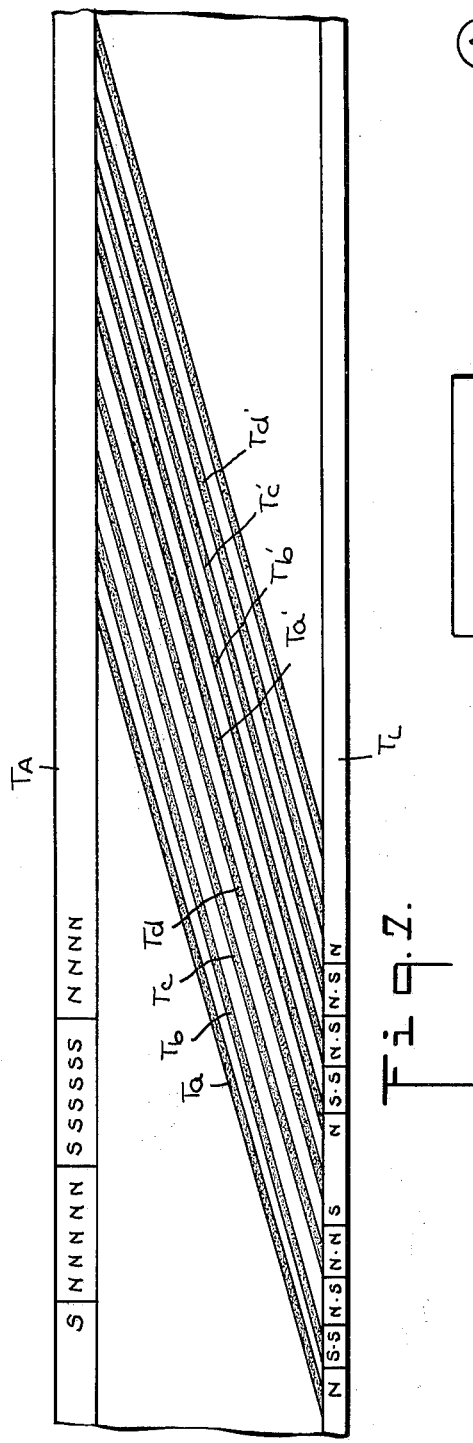
Figure 8:
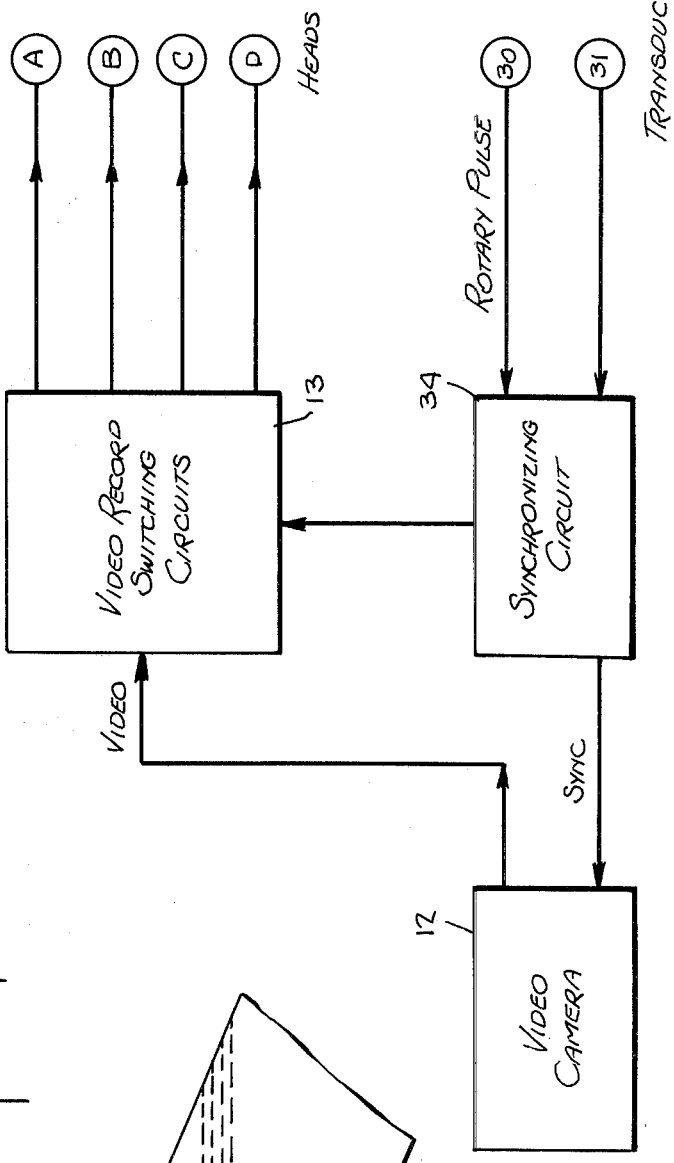
Figure 8A:
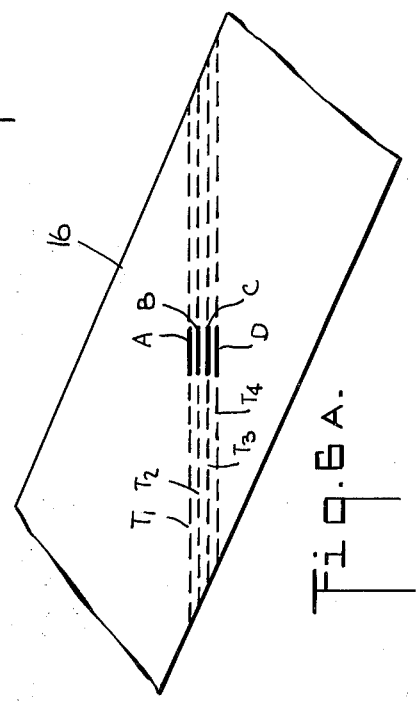
Figure 11:
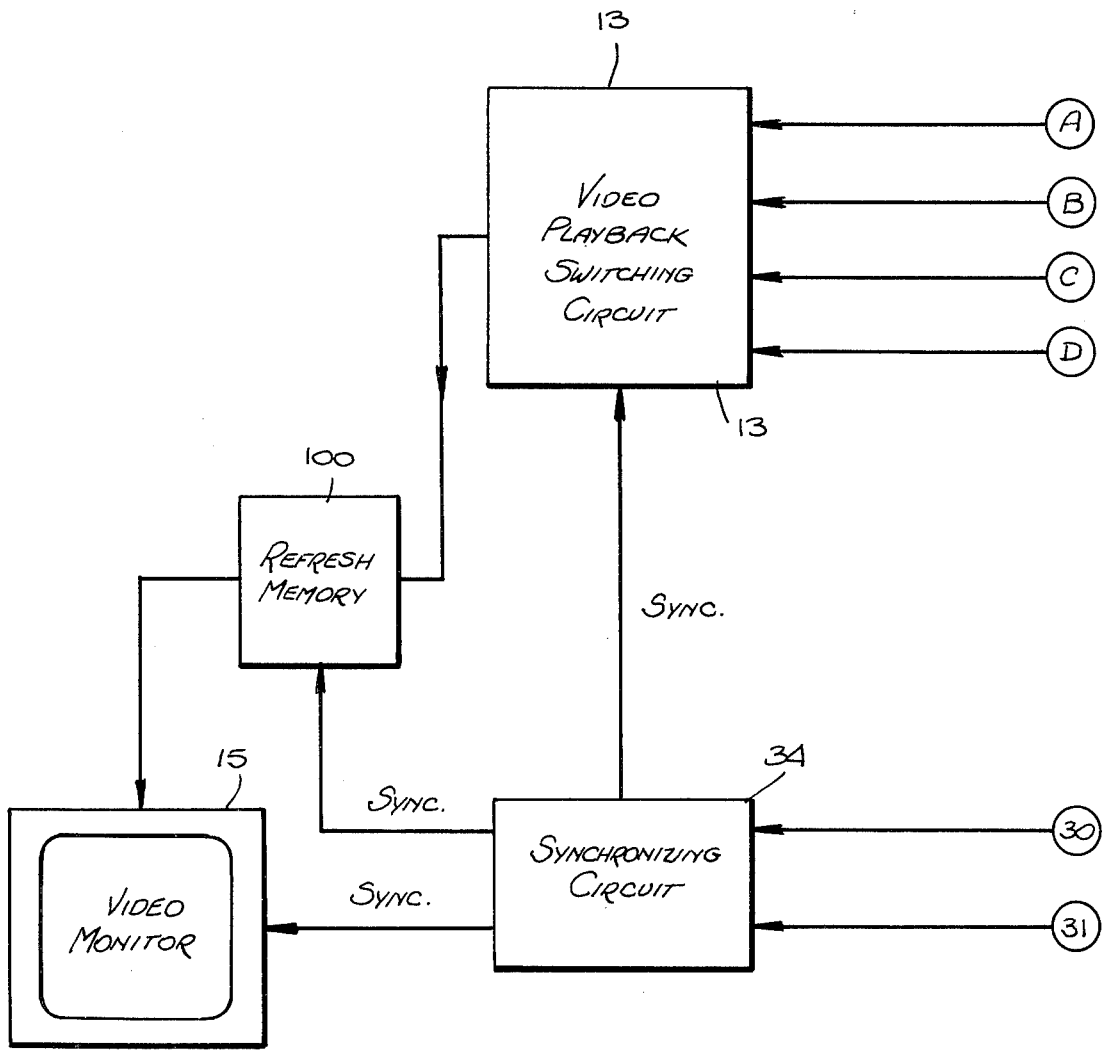

FIG. 6, consisting of 6 and 6A, is an elevational view of the stationary cylinders within which the head assembly rotates, and FIG. 6A illustrates the relationship of the heads of the assembly to the magnetic tape;

FIG. 7 illustrates the various tracks recorded on the magnetic tape;

FIG. 8 is a block diagram of the video system in the storage mode;

FIG. 9 is a block diagram of the video system in the playback mode;

FIG. 10 illustrates the wave forms of the signals yielded by the various heads in the playback mode; and FIG. 11 is a block diagram of a system in accordance with the invention which incorporates a Refresh Memory.

DESCRIPTION OF INVENTION

The General System

Figure 1:
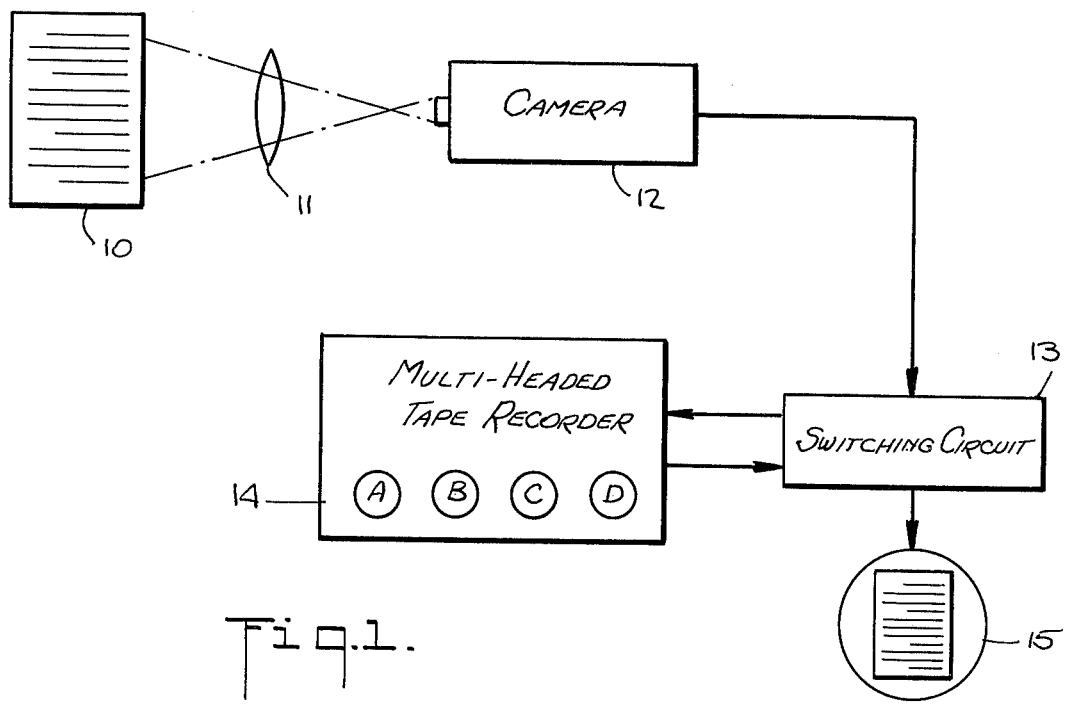

Referring now to FIG. 1, there is shown in simplified form, the basic components of a video system for storing and retrieving documentary information. Information, represented by a printed document 10, is placed on an illuminated platen. An optical image thereof is focused by a suitable lens assembly 11 onto the photosensitive surface of a high-resolution T-V camera tube 12. In the camera tube, an electron beam sweeps across the photosensitive surface to generate a video signal representing the varying brightness of the picture elements constituting the document image.

We shall, for purposes of illustration, provide the necessary high resolution by using a frame line number of 1050 lines per frame, which is two times higher than the standard 525 frame line number. The high-resolution frames have a repetition rate of 15 frames per second, which is one half the standard repetition rate of 30 frames per second. There are four standard fields per frame.

In the storage mode, when documents are to be recorded, the high-resolution video signal yielded by camera 12 is fed through an electronic switching circuit 13 to the respective heads of a multi-headed magnetic recorder 14 which, in this example, has four heads, A, B, C and D, a pair of which are mounted on one end of a rotating arm and the other pair on the opposing arm. The switching circuit acts effectively to divide the frame signal of 1050 lines into four distinct fields having a like number of lines (262½), each field being produced within a 1/60th of a second interval. Thus each field is very nearly identical to a field in standard low-resolution television.

The heads are vertically offset with respect to each other and are caused by the rotating arm to sweep across a magnetic tape while the tape is stationary so that two heads traverse separate tracks on the tape in the course of one arm rotation. Two revolutions are therefore necessary to record four tracks.

The head positions and switching sequence are such that first the head to which the first field is applied sweeps across the tape to record the first track, and when the first head departs from the tape, the second head to which the second field is applied then proceeds to record the second track in a position parallel to the first track, and so on, until the four fields are recorded to form a set of four parallel tracks.

To record the various documents, the tape is indexed after each set of tracks is recorded to present a fresh tape zone for recording the set of four tracks representing the next document. Address information is also recorded along the edge of the tape to facilitate the retrieval of the recorded information. A longitudinally-extending control track is also provided for accurate positioning of the tape. While the field image tracks are made by rotating the recording heads, the address and control tracks are made, as will later be explained, by stationary heads.

In the playback mode, when on wishes to retrieve a particular document, the set of four tracks recorded on the tape which together represent the document are first located by means of the address, and the four tracks are played back in the proper sequence by means of switching circuit 13 operating in the playback mode. The playback is continuous to recreate the high-resolution 1050 line frame signal. This signal is applied to a high-resolution T-V display device 15.

The Multi-Headed Recorder

Referring now to FIG. 2, there is shown the transport mechanism of a tape recorder in accordance with the invention. The magnetic tape 16 to be recorded is wound on a supply reel 17, the tape being typically ½ inch wide and 2000 feet long.

Tape 16, when it is drawn from reel 17, first passes by an erase head 18 which functions to remove any previous recording. The tape then turns about an idler 19 from which it is carried around the periphery of a pair of split stationary cylinders 20 and 20A (see FIG. 6) and about an idler 21. Next in the tape path we find an addressing magnetic head 22 followed by a locator magnetic head 23, the former being used to approximately locate the position of any section of the tape and the latter for precise location of the desired tape signals.

A pair of pinch rollers 24 acts to pull tape 16 through the mechanism when such movement is necessary, the tape then being rewound on a take-up spool 25. Mounted for rotation about a shaft coaxial with split cylinders 20 and 20A, is the arm 26 of the rotating head assembly. Supported on one end of arm 26 is a pair of magnetic recording heads A and C, and on the other end thereof is a pair of recording heads B and D. Electrical connections to these heads are made through concentric slip rings 27. The arm rotates in a horizontal plane extending through the gap G between cylinders 20 and 20A.

Underlying arm 26 and rotating therewith is a ring 28 having a permanent magnet 29 mounted thereon. Magnet 29 is operatively associated with a pair of diametrically-opposed stationary magnetic transducers 30 and 31, such that when magnet 29, in the course of a rotating cycle, intercepts each of these transducers, a pulse is generated thereby, indicative of the angular position of the arm.

As shown in FIG. 6, idler 19 is disposed adjacent upper cylinder 20, whereas idler 21 is adjacent lower cylinder 20A, the shape and position of these idlers being such as to cause tape 16 to make a wrap of approximately 190° around both cylinders 20 and 20A. Thus tape 16 in advance of idler 19 extends along a horizontal path at the same level as cylinder 20, then the tape is skewed to embrace the cylinders. The tape leaving idler 29 then resumes a horizontal path extending at the same level as the lower cylinder.

As illustrated in FIGS. 4 and 5, heads A and C which are mounted on one end of arm 26 are both horizontally and vertically offset with respect to each other, and heads B and D mounted on the other end of this arm are similarly offset so that each head which passes through gap G in the course of arm rotation occupies a distinct vertical position, one above the other.

In a preferred form, recording heads A and C, rather than being horizontally offset, would be vertically stacked one above the other, as would be the case for heads B and D, inasmuch as the present system only requires a vertical displacement of the four heads (or whatever other number of heads is used). However, because of head thickness and gap size as well as other practical considerations, a side-by-side configuration, as shown, represents an acceptable compromise.

The rotating head assembly is mounted on a shaft 32 operatively coupled to a motor 33 which drives the assembly at 1800 rpm. Thus in the course of one revolution, head A, operating within gap G, sweeps across that portion of stationary tape 16 which is wrapped about cylinders 20 and 20A to record a track thereacross at a position determined by the vertical level of this head.

In the course of the same revolution, head B, whose position on the arm is diametrically opposed to that of head A, sweeps across the tape to record a second track thereacross which is parallel to the first track, since it is at a slightly lower level than head A. In the course of the second revolution of the assembly, heads C and D produce parallel third and fourth tracks.

The switching arrangement associated with the heads is such that the frame signal from the video camera is divided into four fields which are applied in sequence to heads A, B, C and D, so that these fields are recorded on the stationary tape in a set for four parallel tracks.

The geometric relationship of heads A, B, C and D to tape 16 can best be appreciated from FIG. 6A, where it will be seen that heads A, B, C and D form a vertical stack and serve to create a set of horizontal tracks $T_1$, $T_2$, $T_3$ and $T_4$ across tape 16 which is skewed relative to the heads. But tape 16 not only has the transverse recordings thereon produced by the rotating head assembly but, as shown in FIG. 7, it also carries longitudinal recordings on the edge of the tape, track $T_A$ being an address track, and track $T_L$ being a locator track.

Operation in Storage Mode

Referring now to FIG. 8, the system arrangement in the storage mode is illustrated in simplified form. It will be seen that the video frame signal from video camera 12 is fed through switching circuit 13 to recording heads A, B, C and D of the rotating head assembly whereby the frame signal is divided into four fields having a like number of scan lines which are applied in sequence to heads A to D.

Synchronization is effected by a synchronization circuit 34 which is responsive to the pulses generated by fixed transducers 30 and 31, these pulses being produced at 180° intervals in the course of each rotation of the head assembly.

We shall assume, at the outset of operation in this mode, that the tape has been completely erased by the bulk erase head 18. Before documentary information is filed on the tape, the entire tape is run through the recorder and positional information is entered therein by stationary heads 22 and 23 (FIG. 2), along the longitudinally-extending address and locator tracks $T_A$ and $T_L$.

We shall now make a recording at a particular track site. This effected by advancing the tape until the desired address thereon is found by address head 22 which reads address track $T_A$. The precise tape location is found by locating head $T_L$ which reads track $T_L$. At this point, tape movement is arrested and the tape remains stationary during the recording of one entire video frame signal representing the particular document to be filed.

In making this recording, the head assembly carrying recording heads A to D is rotated, in the course of which pulses are produced by transducers 30 and 31 when they are intercepted by the rotating permanent magnet 29 (FIG. 3). These pulses are indicative of the angular position of the arm and occur at the instant when the recording heads are to be switched. Synchronizing circuit 34 conditions these pulses and applies them as sync pulses to switching circuit 13 as well as to video camera 13.

Camera 12 scans the document to produce a video frame signal having 1050 lines in 1/15 seconds. This video frame signal is divided into four fields each constituted by 525 lines in 1/60th of a second. The four fields are applied sequentially by switching circuit 13 to heads A, B, C and D which record the fields on tracks $T_a$, $T_b$, $T_c$ and $T_d$ on the tape to produce a set of tracks representing the filed document, as shown in FIG. 7.

In operation, as head A is just leaving track $T_a$, head B, which is displaced 180° from head A then enters track $T_b$. 180° later, when head B is just clearing track $T_c$, head C then enters track $T_c$. Finally, as head C is just leaving track $T_c$, head D, which is displaced 180° from head C, enters track $T_d$ to complete the recording. It therefore takes two revolutions of the head assembly to record a set of four tracks on the stationary tape.

The relationship of the heads to the video frame signal (1050 lines) and the sync pulse is illustrated graphically in FIG. 10. The wave form of the video frame signal is shown by line 5, this signal being developed during a scanning period running 4/60th of a second. This period is divided by sync pulses produced by transducers 30 and 31, which pulses occur at 180° intervals, so that in the course of two rotations, pulses are produced at 1/60th of a second intervals, thereby dividing the frame signal into four fields each having a 1/60th of a second duration and 262½ lines.

Head A is switched on to record the first field, as shown in line 1, after which head B is switched on to record the second field, as shown in line 2. Then head C is switched on to record the third field, after which head D is switched on to record the fourth field, the instants of switching being coincident with the sync pulses.

If one now wishes to record another frame, the tape is indexed approximately ¼ inch longitudinally, so that now heads A, B, C and D are aligned with tracks $T_{a'}$, $T_{b'}$, $T_{c'}$, and $T_{d'}$, as shown in FIG. 7. The recording operation is repeated to enter the second frame on the tape.

Thus in the storage mode, high-resolution signals, each representing a document frame, are converted into signal fields suitable for storage on standard low-resolution recording tape, these fields being reconstituted in the playback mode into a high-resolution signal suitable for display.

Operation in Retrieval Mode

The video signal frame just recorded may be played back using the arrangement shown in FIG. 9, where now the heads A, B, C and D function as playback heads whose outputs go to switching circuit 13 so as to apply the signals from tracks $T_a$, $T_b$, $T_c$, and $T_d$ in sequence to the video display device or monitor 15.

Monitor 15 and switching circuit 13 is supplied with sync pulses by synchronization circuit 34 which is actuated by pulses derived from transducers 30 and 31 whereby a sync pulse is produced every 180° in the course of rotation of the head assembly. Thus the electron beam in the monitor is caused to trace a field and frame pattern similar to that which the video camera originally traced.

It is to be noted that in the course of two revolutions of the head assembly, each head scans its associated track on the tape device twice, thereby playing back the recorded field twice. But only one of the two fields derived from each head is fed to the monitor by the switching circuit.

The recorded head assembly in the retrieval mode operates continuously to play back the fields as long as one wishes to observe the retrieved document, thereby providing repetitive video frame signals to maintain the brightness of the monitor screen. This capability is valuable, for it obviates the need for a separate REFRESH memory which would be required when using a standard video tape recorder.

Optional "Refresh Memory" Used in Retrieval Mode

Although one of the major advantages of the multi-headed stationary tape system is to eliminate the need for a refresh memory in many cases, there are still advantages to using such a tape system in conjunction with a buffer.

Thus the arrangement in FIG. 11 is almost identical to that in FIG. 9 save that a Refresh Memory 100 has been added thereto. A memory suitable for this application is the Intel Corporation IN-65 charge-coupled device memory, typically incorporating about a million bits of solid state memory. Alternatively, other types of memory, such as video discs and image converters, may be used.

The major reason for incorporating an independent Refresh Memory is that a frame repetition rate of 15 per second does produce a flicker objectionable to some observers, particularly when used with a cathode ray tube having standard TV phosphors.

Refresh Memory 100, which is interposed between video playback switching circuit 13, and video monitor 15 is capable of accepting and recording a single four-field frame from the circuit 13 during a period of 1/15 second. Refresh Memory 100 then functions to present this image to video monitor 15 at the normal standard TV rate of 30 frames per second, 60 fields per second.

In this arrangement, the various advantages of a stationary tape system in accordance with the invention over moving tape will still be operative. These are:

(1) No buffer is needed during initial recording.

(2) Simplicity of synchronization.
(3) Simple stepping motion from frame to frame.

Scanning

Although the invention is not limited to any particular type of scanning system, inasmuch as the video information contained within a single frame is divided into a number of fields, the number should always be equal to the number of heads used in the rotating head assembly. Thus instead of four fields, one may use six fields and hence a six-headed recorder. Or instead of a single arm, each head may be on a separate arm which is angularly displaced from the other arms.

In the example given, which makes use of four fields and four heads, in order to prevent flicker, these fields should be interlaced, such interlacing being well known in the art. All video recording heads are preferably at some multiple of 180° from each other so that as one head leaves its associated track, the next head in the recording sequence then enters its associated track.

In order to provide a simple example and to explain the principles underlying the invention, the number of horizontal scan lines per frame has been given as 1050. This number of scan lines is perfectly feasible. However, the most common method of producing interlaced fields is predicated on having each new field start after a fraction of the preceding line. Thus, a system more compatible with present day standards would be one having 1049 total scan lines per frame. Dividing 1049 by four equal length fields results in the first field ending at 262 1/4, the second field ending at 524 1/2, the third field ending at 786 3/4, and the fourth field ending at 1049. But if one wishes to use 1050 scan lines, it is merely necessary to develop a small vertical offset voltage which is present during alternate fields.

While there has been shown and described a preferred embodiment of a video system for storing and retrieving documentary information in accordance with the invention, it will be appreciated that many changes and modifications may be made therein without, however, departing from the essential spirit thereof. Thus while the system has been shown as including a camera and display tube at the same location, in practice, the display tube and a control terminal for selecting a particular document from the video file may be at a remote location linked to the central file by a conventional coaxial cable for low resolution video signals. The fields which are transmitted sequentially over this cable correspond to existing T-V standards and may be processed using standard equipment.

I claim:
1. A high-resolution video filing system for storing and retrieving documentary information, said system having a storage mode in which each document to be filed is electro-optically scanned and magnetically recorded and a retrieval mode in which a selected recording is played back and displayed to recreate the document in readable form, said system comprising:
A. a high-resolution video camera for scanning each document to be filed to produce a video signal representing a single image frame having a predetermined number of scan lines in excess of 1,000;
B. a multi-headed magnetic tape recorder having a rotating head assembly whose series of heads are offset with respect to each other in a direction normal to the plane of rotation and act to successively sweep across a stationary magnetic tape to record thereon in the storage mode of the system a like series of parallel transverse tracks, each head being associated with a respective track, and in a retrieval mode to repeatedly play back the recorded tracks, said recorder including means to produce pulses representing the angular position of the rotating head assembly;

C. a high resolution video display device capable of reproducing said document in response to said video signal representing a single image frame;

D. electronic switching means coupled to said camera in the storage mode to divide said video signal representing a single image frame into fields equal in number to the number of said heads in said series thereof and to sequentially feed said fields to the respective heads of the recorder to record said fields on said tracks and to thereby produce a set thereof representing said document, and in the retrieval mode to sequentially feed the played-back fields to said display device to recreate said video signal representing a single image frame and thereby display said document; and E. a synchronizing circuit responsive to the pulses representing the angular position of the head assembly to produce sync pulses for governing the operation of the electronic switching means.

2. A system as set forth in claim 1, further including means to record along the longitudinal edges of said tape address and locating data.

3. A system as set forth in claim 1, wherein said head assembly includes a rotating arm having two of said heads mounted on one end and the other two heads mounted on the other end, said video signal being divided into four fields which are applied sequentially to said four heads.

4. A system as set forth in claim 3, wherein said arm rotates in a plane extending through a gap between a pair of stationary cylinders, said tape being partially wrapped about said cylinders at an angle thereto, whereby said heads sweep across tape through said gap.

5. A system as set forth in claim 5, wherein said means to produce said pulses is constituted by a permanent magnet mounted to rotate with said arm and operatively coupled to two stationary transducers at diametrically-opposed positions to produce a pulse at each 180° position of said arm.

6. A system as set forth in claim 1, further including tape transport means to advance said stationary tape one step after each recording of a set of fields representing one document to be filed to present a fresh stationary tape zone to the recording heads for recording another document to be filed.

7. A system as set forth in claim 1, wherein said recorder includes an erase head to remove all recordings prior to entry of the tape into the rotating head assembly.

8. A system as set forth in claim 1, further including a refresh memory to store the video information of at least one of said frames during the retrieval mode and provided with means to repeatedly read-out said video information to said video display device.

9. A system as set forth in claim 8, wherein said refresh memory includes means which render it capable of storing said video information at one rate and reading out said information at another rate to avoid flicker.

10. A system as set forth in claim 1, wherein said recorder includes a tape transport mechanism adapted to step said tape from one stationary position to the next so as to record a set of fields at each position representing a distinct document for moving said tape forwards or backwards at a relatively high speed to locate a desired recorded set thereon.

* * * * *

UNITED STATES PATENT OFFICE
CERTIFICATE OF CORRECTION

Patent No. 4,090,223     Dated May 16, 1978

Inventor(s) Arthur W. Holt

It is certified that error appears in the above-identified patent and that said Letters Patent are hereby corrected as shown below:

Column 1, line 36, "means should read -- mean --.

Column 12, claim 5, line 1 "5" should read -- 4 --.

Signed and Sealed this

Seventeenth Day of October 1978

[SEAL]

Attest:

RUTH C. MASON
Attesting Officer

DONALD W. BANNER
Commissioner of Patents and Trademarks